United States Patent
Schweizer et al.

(10) Patent No.: US 8,463,516 B2
(45) Date of Patent: Jun. 11, 2013

(54) STARTER RELEASE

(75) Inventors: Alexander Schweizer, Buehl (DE);
Frank Stengel, Buehl-Neusatz (DE);
Martin Fuss, Wooster, OH (US);
Matthias Ehrlich, Buehl (DE); Behzad Nazari, Nuertingen (DE); Jens Martin, Sinzheim-Kartung (DE); Joachim Hirt, Oberkirch (DE); Martin Zimmermann, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2003 days.

(21) Appl. No.: 11/295,788

(22) Filed: Dec. 7, 2005

(65) Prior Publication Data
US 2006/0144667 A1   Jul. 6, 2006

(30) Foreign Application Priority Data
Dec. 23, 2004   (DE) .......................... 10 2004 061 954

(51) Int. Cl.
*G06F 7/00* (2006.01)
*G06F 17/00* (2006.01)
*G06F 19/00* (2011.01)

(52) U.S. Cl.
USPC .................................. 701/67; 701/1; 701/68

(58) Field of Classification Search
None
See application file for complete search history.

(56) References Cited

U.S. PATENT DOCUMENTS

| 5,335,174 A * | 8/1994 | Kohno et al. ................... 701/68 |
| 5,632,706 A * | 5/1997 | Kremmling et al. ............ 477/74 |
| 6,364,813 B1 * | 4/2002 | Patel et al. ..................... 477/174 |

FOREIGN PATENT DOCUMENTS

| DE | 197 32 924 | 2/1998 |
| DE | 199 00 820 | 9/1999 |
| DE | 103 20 280 | 11/2003 |

* cited by examiner

*Primary Examiner* — Khoi Tran
*Assistant Examiner* — Bhavesh V Amin
(74) *Attorney, Agent, or Firm* — Simpson & Simpson, PLLC

(57) ABSTRACT

A process and device for controlling a motor vehicle with an initialization device (43) for startup and a clutch actuated by means of a clutch actuator set (45) between a drive unit and a gear with a control device (41) by means of which at least one control of the clutch actuator set (45) and an acquisition of measurement data of a sensor (47) takes place for the purpose of determining the position of the clutch, characterized in that to verify the state "clutch open" upon startup, a positioning of the clutch actuator set (45) that has been set and stored before or during shutdown is compared to a positioning that was acquired during a predetermined movement course of the clutch actuator set (45) after startup by means of a distance measurement, which takes place at least in a segment of that movement course, whereby the state "clutch open" is recognized, in particular, when the magnitude of the comparison is within a predetermined tolerance range. By means of the invention one can further reduce the probability of the setting into motion of a motor vehicle after startup, which is critical in terms of safety.

12 Claims, 2 Drawing Sheets

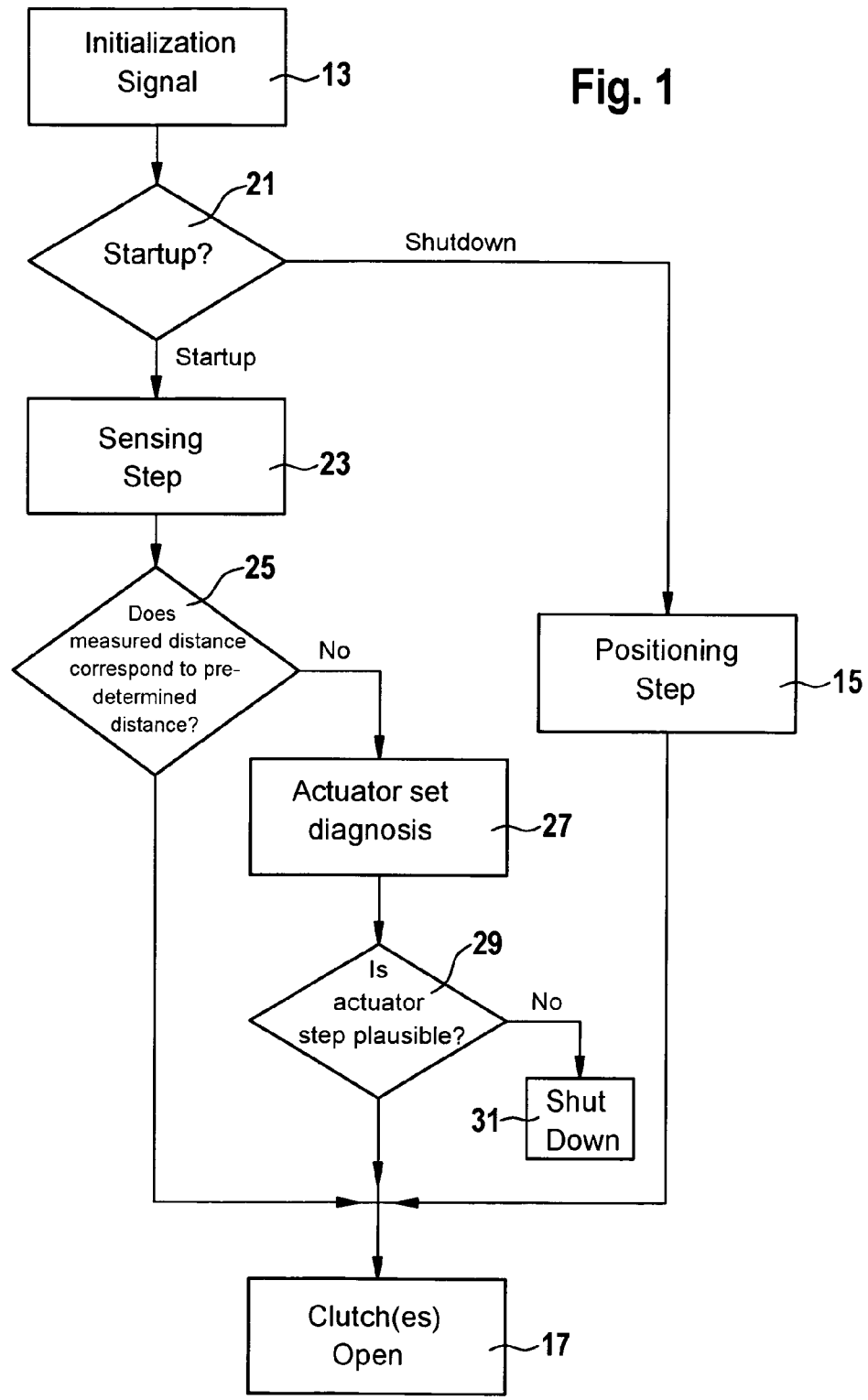

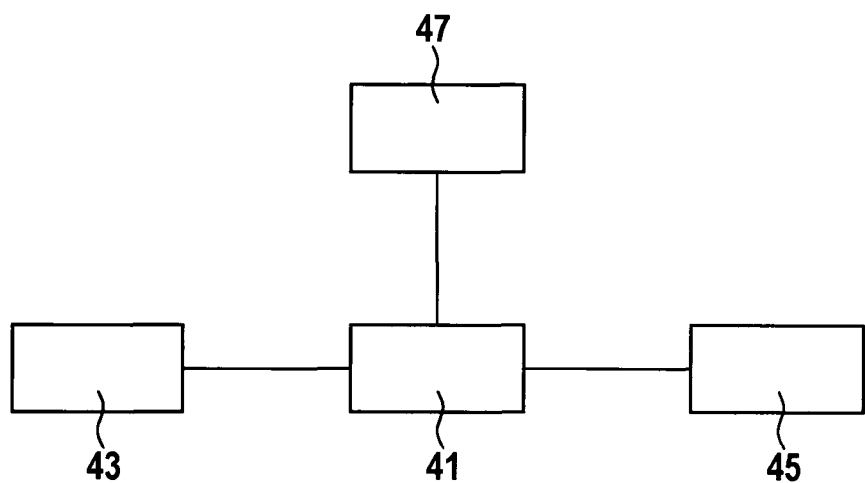

STARTER RELEASE

CROSS REFERENCE TO RELATED APPLICATIONS

This patent application claims priority of German Patent Application No. 10 2004 061 954.9, filed Dec. 23, 2004, which application is incorporated herein by reference.

FIELD OF THE INVENTION

This invention relates to a process with the features according to the preamble of claim 1 as well as a device with the features according to the preamble of claim 12.

BACKGROUND OF THE INVENTION

Devices in motor vehicles that increase driving comfort and safety are known. For example, in connection with the starter release, numerous checks and safety inquiries have been proposed. DE 197 32 924 A1 proposes a plurality of combinations of states of driving state magnitudes that either result in a starter release or that forbid a starter release. The gear position, for example, is such a driving state magnitude. In this connection, one can especially detect whether the neutral position is engaged. Additional driving state magnitudes can be derived from a motor vehicle brake or a torque transmission system. Interrogating switching intention signals can also be included in the evaluation as to whether a starter release is allowed or is not included. When certain states of one or several driving state magnitudes are present, then one can bring about automated actions so that, subsequently, one can ensure a reliable starter release. If, for example, one detects that a neutral position has not been set, then a brake is actuated in an automated fashion and the torque transmission system is disengaged in an automated fashion, and only then is a starter release issued to get the engine started.

DE 199 00 820 A1 presents a servo support device that actuates a starter for the purpose of starting an internal combustion engine only when the neutral position has been set or when a clutch has been completely disengaged.

DE 103 20 280 A1 presents a process and a device for operating an automatic or automated gear with parking brake or rollaway safety. A process for releasing a starting process in a vehicle equipped with an automated gearbox reveals the following process steps: First, one checks to see whether an ignition has been turned on and the engine is turned off and the brake is actuated. If this is the case, one checks to see whether the clutch has been disengaged. If yes, the starter operation is released. The following process steps are proposed in case of a vehicle with an automated gearbox with parking brake: First, one checks to see whether the ignition is on and the parking brake is engaged. The starter is activated if the driver wishes to start the engine up. The disengagement of both clutches is checked in a dual-clutch gear.

In the case of dual-clutch gears, for safety reasons, one advantageously cannot use the self-locking clutch actuator sets, which, due to spring devices, run currentless into the state "clutch open." This property of a clutch is also referred to as "normally open" or "forcibly open". In dual-clutch gears, this type of clutch is therefore suitable in a preferred manner because, as both clutches are closed, serious damage can be done in the gear and on the clutches when two different transmission ratios act upon one and the same power takeoff shaft. This is why, in the case of dual-clutch gears, there is a basic rule to the effect that both clutches must be opened in situations that are critical in terms of safety. In the case of automated gearboxes or manual gearboxes, on the other hand, one basically applies the concept of not changing the clutch setting in situations that are critical in terms of safety. This is why vehicles with only one clutch are mostly equipped with the self-locking clutch type, which is closed in its basic state. This is also referred to as "normally closed" or "forcibly closed".

The distance measurements that are required in this connection are performed by a sensor. This can be done by a path or travel sensor directly as an absolute path measurement, incremental path measurement or differential path measurement on the crankshaft. In case of a brushless EC engine that drives the clutch actuator set, for example, one can also perform the incremental path measurement so that, assuming a typical length of 20 mm of the total path of the actuator set, for example, one can attain a referencing accuracy of 0.2 mm, in other words, one percent of the total path.

If the clutch actuator set is moved into a predetermined position and if it is left there for a period of time, then one talks in terms of "parking" the clutch in that position.

To start the vehicle or to turn it off, one uses an initialization device, which, for example, can be designed in the form of an ignition lock with ignition key or also in the form of a button or switch with a card. By turning the ignition key or by pressing the button, the driver can start operating the vehicle before every run or he can turn it off at the end of each run.

BRIEF SUMMARY OF THE INVENTION

The object of the invention at hand is to propose a process and device that will make it possible further to reduce the probability of states that are critical in terms of safety in conjunction with the starter release. It is especially an unexpected immediate setting-in-motion of the vehicle after it has been placed in operation, which is considered as critical in terms of safety.

This problem is solved by a present invention process.

According to the invention, the starter release is given only when two conditions are met, that is to say, the parking brake is on and the clutch is open—in case of a dual-clutch gear, both clutches are open. With regard to safety, one has thus met a redundancy requirement, that is to say, that each of the two conditions be adequate in itself in terms of preventing a movement of the vehicle after it has been started up.

The following strategy is proposed according to the invention in order to check whether both clutches are open: If the vehicle is parked, then as the clutch actuator is shut down—in case of a dual-clutch gear, both clutch actuators—a predetermined distance is positioned remote from the "clutch open" stop. The actuator or the actuators remain in that position until the vehicle has been started again. After the start of operation, one proceeds with the actuator or the actuators in the direction of "clutch open" until a stop is recognized. If a stop is attained after an anticipated distance, then it is considered that the state—to the effect that the clutch or clutches are open—has occurred. If the stop is not found in the expected position, or in case of a dual-clutch gear only of one of the two actuators, then the actuator set must be checked in regard to its proper operation, something that can result in a delay of the starter release. If the diagnosis turns out plausible, then the starter is released. The described procedure, in particular, parking at a predetermined position, is particularly suitable for a self-locking clutch actuator set where every change in the actuator position takes place electrically. If the actuator set is not self-locking, then it is advantageously stopped during shutdown precisely at the "clutch open" stop because, when the electric motor is turned off—which, when the vehicle is in operation, is used to move the actuator set—a spring device will move the clutch into the opened state. To check the actuator set, one can, as the vehicle is started up, first of all move by the predetermined distance in the direction of the closed clutch, and one can then, from there, seek the stop.

With the help of the invention-based process and the invention-based device, one can make sure that in case of a dual-clutch gear, both clutches will be opened, and in the context of the check that has been performed, they will be in the operating state before the starter release is given.

BRIEF DESCRIPTION OF THE DRAWINGS

Additional advantages and advantageous embodiments of the invention are covered in the following figures and their description:
Specifically:
FIG. 1 is a diagram illustrating the invention-based procedure; and,
FIG. 2 is a diagram illustrating the cooperating components.

DETAILED DESCRIPTION OF THE INVENTION

In a flow chart according to FIG. 1, the entire procedure is illustrated in a schematic manner to illustrate the process for a safe starter release. The process is used in a motor vehicle always when an initialization signal 13—which can mean either "shut down" or "place in operation"—issues from the initialization device 43 (FIG. 2), that is to say, when the driver by means of initialization device 43 indicates that he would like to turn the vehicle off or start it. Once the car is started, there thus takes place a switch from "shut down" to "starting" 21 and, according to the invention, the sensing step 23 is performed. In case of a self-locking clutch, one moves with the actuator set in the direction of "clutch open" until a stop is recognized and the distance traveled is measured. In working with a non-self-locking clutch actuator set, one first of all moves the predetermined distance in the direction of "clutch closed" and then, from there, one seeks the stop "clutch open" and one measures the distance. The distance measured in sensing step 23 is now compared in comparison step 25 with the predetermined distance. In case of a dual clutch, the distances covered by both actuators are measured separately and two comparisons are made. If the measured and predetermined distances correspond to each other within a tolerance range of two percent of the entire actuator travel, then one considers that the state "clutch open" is confirmed. When the measured and the predetermined distances deviate from each other more than by the tolerance range given in advance, then the actuator set must, in diagnosis step 27, be subjected to an examination as to erroneousness. If the actuator set behaves in a plausible manner 29, then the state "clutch open" 17 is considered as fulfilled. If it does not behave in a plausible manner, then the starter release is not given; instead, a shutdown 31 is performed. In case of a dual clutch, both clutches must always run through the described procedure and meet the mentioned conditions. Starting with routine operation such as it exists when driving on the superhighway, or on country roads, or in city traffic when the driver has stopped the motor vehicle and wants to park it and turn it off and, for that purpose, using initialization device 43 (FIG. 2) makes a change from "in operation" to "shut down" 21, then positioning step 15 is performed according to the invention. In case of a self-locking clutch actuator set where every movement of the actuator set is brought about by an electric motor, it is thus moved into a position where the predetermined distance is remote from the stop "clutch open" in the direction of the closed clutch. In case of a non-self-locking actuator set, this position step 15 is placed precisely upon the stop "clutch open" in that, after the vehicle has been shut down, the actuator, due to impacting by an energy storage unit such as, for example, a spring device, is moved to the stop "clutch open." In the case of a dual clutch, the method described is performed with both clutches.

FIG. 2 is a diagram illustrating the device for the release of a starting procedure in a motor vehicle as well as additional participating and cooperating vehicle components. If the driver parks his car and moves the vehicle with initialization device 43 into the shut-down state, this information is also passed on to the control device 41. Positioning step 15 (FIG. 1) is thereupon performed according to the invention. In case of a self-locking clutch actuator set, the actuator set is moved by the motor moving it for a predetermined distance from the stop "clutch open" in the direction of the closed clutch and is parked there. In case of a non-self-locking actuator device, a spring device—which can be arranged in the action area between the clutch, for example, the disc spring tongues and the actuator drive, for example, the electric motor drive of the actuator without any involvement of the invention—will cause the clutch actuator set to move up to the stop "clutch open." If the car is started up again by means of starting 21 (FIG. 1), then this is relayed from the initialization device 43 to the control device 41. Upon startup, control device 41 sees to it that sensing step 23 (FIG. 1) is performed. In case of a self-locking clutch actuator set 45, control device 41 causes the actuator motor to move the clutch actuator set in the direction of "clutch open," while simultaneously, it causes a sensor 47 to measure the distance until the stop "clutch open" has been attained. Subsequently, control device 41 compares the measured and predetermined value. When the measured and the predetermined distance correspond to each other in the context of a tolerance range, the state "clutch open" is considered as being confirmed. If, for example, while the vehicle was at a standstill, the position of the clutch actuator set 45 was changed by more than the tolerance range, then the measured and the predetermined distances will no longer correspond to each other and control device 41 must bring about a function check of the actuator set in diagnosis step 27. A discrepancy between the measured and the predetermined distances can occur, for example, when, in sensing step 23 (FIG. 1), the stop "clutch open" is attained only presumably and when, for example, the friction shortly before the attainment of the stop "clutch open" increases greatly and thus simulates the attainment of the stop. In case of a non-self-locking clutch actuator set 45, control device 41 causes the actuator motor first of all to move the clutch actuator set 45 by the predetermined distance in the direction of "clutch closed". There, control device 41 stops the actuator motor and causes it to move the clutch actuator set now in the reverse direction, in the direction of "clutch open". In this direction of movement, control device 41 causes the sensor 47 to measure the distance covered until the stop "clutch open" has been attained. Control device 41 makes it possible to compare the measured and the predetermined distances: If the measured and the predetermined distances correspond to each other in the context of the tolerance range, then the non-self-locking clutch actuator set 45 is considered as being in the state "clutch open". A disagreement of the two distances, in other words, a deviation of the two distances from more than the tolerance range, can occur when either in positioning step 15 (FIG. 1) or in sensing step 23 (FIG. 1) the stop "clutch open" has been attained only presumably. If the distances do not agree, then a check is performed on the functional capability of the clutch in diagnosis step 27.

LIST OF REFERENCES

13 Initialization signal
15 Positioning step
17 Process step
19 Process step
21 Process step
23 Sensing step
25 Comparison step
27 Diagnosis step
29 Process step
31 Process step
41 Control device
43 Initialization device
45 Clutch actuator set
47 Sensor

What is claimed is:

1. A process for controlling a motor vehicle start up, the motor vehicle including a clutch, an initialization device, a clutch actuator set, a control device, and a sensor, wherein the clutch actuator set is located between a drive unit and a gear and wherein the clutch is actuated by means of the clutch actuator set, comprising:
   receiving in the initialization device, information that the motor vehicle is in a shutdown;
   displacing the clutch actuator to a first position and storing the first position in response to receipt of the information regarding the shutdown;
   executing a predetermined movement course of the clutch actuator set after a startup, wherein the predetermined movement course includes opening the clutch;
   determining, using the control device and data acquiring from the sensor, a second position of the clutch after opening the clutch as part of the predetermined movement course;
   comparing the first and second positions to determine a magnitude of the difference between the first and second positions; and,
   verifying that the clutch is in a "clutch open" state when the magnitude of the difference is within a predetermined tolerance range.

2. The process according to claim 1, wherein a self-locking clutch actuator set before or during the shutdown is positioned remote by a predetermined distance from a stop "clutch open" in the direction of "clutch closed".

3. The process according to claim 1, wherein a non-self-locking clutch actuator set is moved before or during shutdown upon a stop "clutch open".

4. The process according to claim 2, wherein upon startup, one moves with the self-locking clutch actuator set in the direction of "clutch open" and that the covered distance is measured until a stop is recognized.

5. The process according to claim 3, wherein upon startup using the non-self-locking actuator set, one moves for a predetermined distance in the direction "clutch closed" and that one stops then and thereupon moves back in the other direction, in the direction of "clutch open", and that the return-run distance is measured until a stop is recognized.

6. The process according to claim 1, wherein the movement and positioning of the actuator set take place electrically with an actuator motor.

7. The process according to claim 1, wherein a reset movement of the actuator set in the direction of "clutch open" takes place through impacting by a spring device.

8. The process according to claim 1, wherein the clutch is considered as opened when the deviation of a measured distance from a predetermined distance is within the predetermined tolerance range.

9. The process according to claim 1, wherein the clutch is subjected to a diagnosis procedure when the deviation of a measured distance from a predetermined distance is not within the predetermined tolerance range.

10. The process according to claim 9, wherein the starter release is not given when the diagnosis procedure determines an implausible actuator set behavior.

11. The process according to claim 1, wherein the procedural steps must be applied to both clutches in case of a dual-clutch gear.

12. A device for controlling a motor vehicle start up, comprising:
    a clutch actuator set located between a drive unit and a gear;
    a clutch actuated by means of the clutch actuator set;
    an initialization device;
    a control device; and,
    a sensor, wherein the initialization device is for receiving information that the motor vehicle is in a shutdown and transmitting the information to the control device and wherein the control device is for:
    causing the clutch actuator to displace to a first position and storing the first position in response to receipt of the information regarding the shutdown;
    causing the clutch actuator to execute a predetermined movement course of the clutch actuator set after a startup, wherein the predetermined movement course includes opening the clutch;
    determining, using data acquiring from the sensor, a second position of the clutch after opening the clutch as part of the predetermined movement course;
    comparing the first and second positions to determine a magnitude of the difference between the first and second positions; and,
    verifying that the clutch is in a "clutch open" state when the magnitude of the difference is within a predetermined tolerance range.

* * * * *